(12) United States Patent
Bai et al.

(10) Patent No.: US 12,047,968 B2
(45) Date of Patent: Jul. 23, 2024

(54) CONFIGURATION ACTIVATION/DEACTIVATION METHOD, NETWORK DEVICE AND TERMINAL

(71) Applicant: DATANG MOBILE COMMUNICATIONS EQUIPMENT CO., LTD., Beijing (CN)

(72) Inventors: Wei Bai, Beijing (CN); Xuejuan Gao, Beijing (CN); Yanping Xing, Beijing (CN); Lei Wang, Beijing (CN)

(73) Assignee: DATANG MOBILE COMMUNICATIONS EQUIPMENT CO., LTD., Beijing (CN)

( * ) Notice: Subject to any disclaimer, the term of this patent is extended or adjusted under 35 U.S.C. 154(b) by 349 days.

(21) Appl. No.: 17/607,836

(22) PCT Filed: Apr. 22, 2020

(86) PCT No.: PCT/CN2020/086092
§ 371 (c)(1),
(2) Date: Oct. 29, 2021

(87) PCT Pub. No.: WO2020/221078
PCT Pub. Date: Nov. 5, 2020

(65) Prior Publication Data
US 2022/0232612 A1 Jul. 21, 2022

(30) Foreign Application Priority Data
Apr. 30, 2019 (CN) .......................... 201910365360.4

(51) Int. Cl.
H04W 72/12 (2023.01)
H04L 5/00 (2006.01)
H04W 72/23 (2023.01)

(52) U.S. Cl.
CPC ........... *H04W 72/23* (2023.01); *H04L 5/0053* (2013.01); *H04L 5/0096* (2013.01)

(58) Field of Classification Search
CPC ..... H04W 72/23; H04L 5/0053; H04L 5/0096
See application file for complete search history.

(56) References Cited

U.S. PATENT DOCUMENTS 10,999,870 B2 * 5/2021 Ou ...................... H04W 74/008
2015/0312957 A1 * 10/2015 Pelletier ................ H04W 76/15
(Continued)

FOREIGN PATENT DOCUMENTS

CN 108882371 A 11/2018
CN 109587795 A 4/2019
(Continued)

OTHER PUBLICATIONS

R1-1904148; Title: Enhanced for UL grant free transmission; Source: ZTE; Date: Apr. 12, 2019. (Year: 2019).*
(Continued)

*Primary Examiner* — Fahmida S Chowdhury
(74) *Attorney, Agent, or Firm* — Ladas & Parry, LLP

(57) ABSTRACT

This disclosure provides a configuration activation/deactivation method, a network device, and a terminal. The method includes: transmitting, to a terminal, activation/deactivation information for indicating activation/deactivation of multiple transmission configurations; wherein, the multiple transmission configurations are associated with configuration information of the activation/deactivation information, or a first field of the activation/deactivation information is used for indicating activation/deactivation of first configuration information that is same among the multiple transmission configurations.

16 Claims, 2 Drawing Sheets receiving activation/deactivation information for indicating activation/deactivation of multiple transmission configurations that is transmitted by a network device; wherein, the multiple transmission configurations are associated with configuration information of the activation/deactivation information, or a first field of the activation/deactivation information is used for indicating activation/deactivation of first configuration information that is same among the multiple transmission configurations — 41 activating/deactivating the multiple transmission configurations according to the activation/deactivation information — 42

(56) References Cited

U.S. PATENT DOCUMENTS

| | | | |
|---|---|---|---|
| 2017/0332359 A1 | 11/2017 | Tsai et al. | |
| 2018/0014284 A1 | 1/2018 | Yi et al. | |
| 2018/0048994 A1* | 2/2018 | Kwon | H04W 4/021 |
| 2018/0317213 A1* | 11/2018 | Islam | H04L 1/1614 |
| 2019/0215136 A1* | 7/2019 | Zhou | H04L 1/1819 |
| 2020/0028599 A1* | 1/2020 | Zhang | H04B 7/088 |
| 2020/0280424 A1* | 9/2020 | Suzuki | H04W 72/23 |
| 2020/0296693 A1* | 9/2020 | Tang | H04W 24/10 |
| 2020/0322973 A1* | 10/2020 | Li | H04L 5/0055 |
| 2020/0351069 A1* | 11/2020 | Grant | H04B 7/088 |
| 2020/0359459 A1* | 11/2020 | Kakishima | H04L 5/0094 |
| 2021/0083833 A1* | 3/2021 | Zhou | H04L 5/0053 |
| 2021/0105729 A1* | 4/2021 | Park | H03F 3/245 |
| 2021/0273763 A1* | 9/2021 | Wang | H04L 5/0051 |
| 2022/0007411 A1* | 1/2022 | Takeda | H04W 76/30 |

FOREIGN PATENT DOCUMENTS

| | | |
|---|---|---|
| EP | 3451774 A1 | 3/2019 |
| WO | 2017/209478 A1 | 12/2017 |

OTHER PUBLICATIONS

First Korean Office Action for the corresponding Korean Patent Application No. 10-2021-7038677 issued by the Korean Paten Office on Aug. 28, 2023 and it's English Translation provided by the foreign associate.

"Enhanced UL configured grant transmission," 3GPP TSG RAN WG1 Meeting #96bis, R1-1903959, Xi'an, China , Apr. 8-Apr. 12, 2019, Agenda Item: 7. 2 6 6, Source: Huawei, HiSilicon, all pages.

"Enhanced UL configured grant transmissions for URLLC," 3GPP TSG RAN WG1 #96bis, R1-1904086, Xi'an, China, Apr. 8-12, 2019, Agenda Item: 7.2.6.6, Source: vivo, all pages.

"Enhanced Grant-Free Transmissions for eURLLC," 3GPP TSG-RAN WG1 Meeting #96b, R1-1905024, Apr. 8-12, 2019, Xi'an, China, Agenda item: 7.2.6.6, Source: Qualcomm Incorporated, all pages.

International Search Report for PCT Application PCT/CN2020/086092, issued Jul. 22, 2020 and its English Translation.

Written Opinion for PCT Application PCT/CN2020/086092, issued Jul. 22, 2020 and its English Translation.

First Office Action and search report for Taiwanese Patent Application 109114142 issued Dec. 21, 2020 and its English Translation.

"Enhanced for UL grant free transmission" 3GPP TSG RAN WG1 #96bis, R1-1904148, Xi'an, China. Apr. 8-12, 2019, Source: ZTE Agenda Item: 7.2.6.6.

"Multiple active configured grants for URLLC" 3GPP TSG RAN WG1 #96bis, R1-1904445, Xi'an, China, Apr. 8-12, 2019, Agenda Item: 7.2.6.6 Source: Samsung.

"3rd Generation Partnership Project; Technical Specification Group Radio Access Network; NR; Medium Access Control (MAC) protocol specification (release 15)" 3GPP TS 38.321, V15.5.0.

"DCI design for URLLC" 3GPP TSG RAN WG1 Meeting #96bis, R1-1904693 Xi'an, China, Apr. 8-12, 2019, Source: Huawei, HiSilicon Agenda Item: 7.2.6.7.

Extended European Search Report for European Patent Application No. 20798472.5 issued on May 25, 2022.

"Summary of 7.2.6.6 Enhanced UL configured grant transmission," 3GPP TSG RAN WG1 Meeting #96bis, R1-1905609, Xi'an, China, Apr. 8-12, 2019, Agenda Item: 7.2.6.6, Source: NTT Docomo, Inc, all pages.

* cited by examiner transmitting, to a terminal, activation/deactivation information for indicating activation/deactivation of multiple transmission configurations. The multiple transmission configurations are associated with configuration information of the activation/deactivation information, or a first field of the activation/deactivation information is used for indicating activation/deactivation of first configuration information that is same among the multiple transmission configurations  /11

FIG. 1

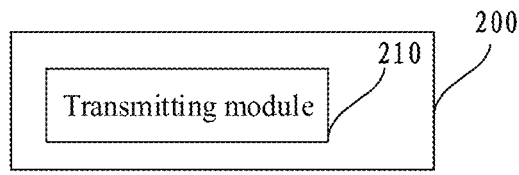

FIG. 2

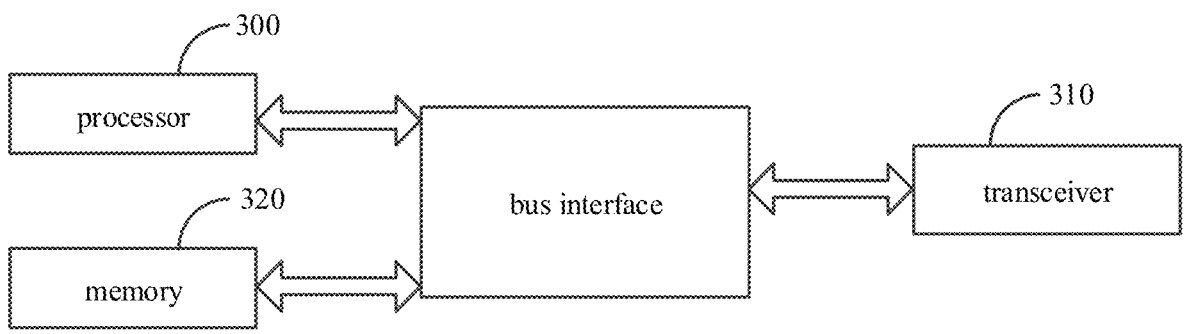

FIG. 3 receiving activation/deactivation information for indicating activation/deactivation of multiple transmission configurations that is transmitted by a network device; wherein, the multiple transmission configurations are associated with configuration information of the activation/deactivation information, or a first field of the activation/deactivation information is used for indicating activation/deactivation of first configuration information that is same among the multiple transmission configurations  /41 activating/deactivating the multiple transmission configurations according to the activation/deactivation information  /42

FIG. 4

CONFIGURATION ACTIVATION/DEACTIVATION METHOD, NETWORK DEVICE AND TERMINAL

CROSS-REFERENCE TO RELATED APPLICATIONS

This application is a U.S. national phase application of a PCT Application No. PCT/CN2020/086092 filed on Apr. 22, 2020, which claims priority to the Chinese patent application No. 201910365360. 4 filed in China on Apr. 30, 2019, the disclosures of which are incorporated herein by reference in its their entireties.

TECHNICAL FIELD

The present disclosure relates to the field of communication technology, in particular to a configuration activation/deactivation method, a network device, and a terminal.

BACKGROUND

With the development and change of mobile communication service requirements, a new wireless communication system (i.e., $5^{th}$ generation new radio access technology (5G NR)) has been researched for future mobile communication systems. In the 5G NR system, there is an important requirement for low-latency and high-reliability communication. Transmission schemes such as Ultra Reliable Low Latency Communications (URLLC) have emerged. For example, in uplink transmission schemes of URLLC, a grant-free solution is adopted in order to reduce the latency, and a retransmission solution is adopted in order to increase the reliability.

Since the arrival of data on the terminal side is random, a configuration period is defined in the uplink grant-free retransmission scheme, at the same time, it is required that after the terminal starts transmission in a period, the transmission must end within the period and cannot exceed the period. This will cause the actual quantity of retransmissions to be less than the configured quantity of retransmissions, which affects reliability. On the premise of ensuring that data is transmitted as soon as possible after it arrivals, in order to improve reliability, multiple parallel configurations are used, and the configurations offset from each other in terms of the start position of the period, that is, a multi-configuration solution is used.

In the type 2 uplink grant-free transmission, the configuration needs to be activated through downlink control information (DCI). Activating one configuration through one DCI causes a large overhead for a physical downlink control channel (PDCCH). When PDCCH resources are insufficient, the configuration cannot be activated until PDCCH resources are available, thus a latency is introduced.

SUMMARY

The present disclosure provides a configuration activation/deactivation method, a network device, and a terminal, so as to solve the problems of large overhead and high latency when multiple transmission configurations are activated.

In a first aspect, some embodiments of the present disclosure provide an configuration activation/deactivation method, including:

transmitting, to a terminal, activation/deactivation information for indicating activation/deactivation of multiple transmission configurations;

wherein, the multiple transmission configurations are associated with configuration information of the activation/deactivation information, or a first field of the activation/deactivation information is used for indicating activation/deactivation of first configuration information that is same among the multiple transmission configurations.

The first field is used for at least one of the following:

indicating a bitmap of a correspondence relationship between configuration indexes corresponding to the multiple transmission configurations and bits; wherein the bits correspond to the configuration indexes in a one-to-one manner;

indicating a first configuration index group, wherein the first configuration index group includes the configuration indexes of the multiple transmission configurations;

indicating a serial number of a second configuration index group, wherein the second configuration index group includes the configuration indexes of the multiple transmission configurations;

indicating the configuration index corresponding to an initial transmission configuration among the multiple transmission configurations arranged in sequence;

indicating the configuration index corresponding to the initial transmission configuration among the multiple transmission configurations arranged in sequence and a quantity of the multiple transmission configurations; or indicating a serial number of a first element in a configuration index set; the first element in the configuration index set corresponds to a configuration index of an initial transmission configuration among the multiple transmission configurations arranged in sequence and a quantity of the multiple transmission configurations.

The multiple transmission configurations are transmission configurations associated with a first search space (SS) or a first control resource set (CORESET) in configuration information of the activation/deactivation information;

the first SS is an SS where the activation/deactivation information is detected, and the first CORESET is a CORESET where the activation/deactivation information is detected.

The activation information used for indicating activation of the multiple transmission configurations includes a second field, and the second field is used for indicating activation of second configuration information that is different among the multiple transmission configurations.

The second configuration information includes at least one of the following:

de-modulation reference signal (DMRS) configuration information;

a time domain offset;

a relative time domain offset; or a hybrid automatic repeat request (HARD) process number offset.

The second field is used for at least one of the following:

indicating second configuration information corresponding respectively to the multiple transmission configurations that are activated;

indicating a serial number of a first configuration information group, wherein, the first configuration information group includes second configuration information of the multiple transmission configurations;

indicating the second configuration information of a first transmission configuration that is activated, wherein the first transmission configuration is a first one of the multiple transmission configurations that are activated and arranged in sequence;

indicating the second configuration information of a first transmission configuration and offsets of the multiple transmission configurations; or indicating a serial number of a first element in a configuration information set, wherein the first element in the configuration information set corresponds to second configuration information of the first transmission configuration and offsets of the multiple transmission configurations.

The first field or the second field or a verification field in the activation/deactivation information is at least one of following items in downlink control information (DCI):

an HARQ process number field;
a DMRS configuration field;
a time domain resource assignment (TDRA) field;
a frequency domain resource assignment (FDRA) field;
a redundancy version (RV) field;
a transmit power control (TPC) field;
a most significant bit (MSB) in modulation and coding scheme (MCS);
a modulation and coding scheme (MCS) field; or
a padding bit field of a predetermined length.

In a second aspect, some embodiments of the present disclosure further provide a network device, including: a transceiver, a memory, a processor, and a program stored in the memory and configured to be executed by the processor, wherein, the processor is configured to execute the program to implement following steps:

transmitting, to a terminal, activation/deactivation information for indicating activation/deactivation of multiple transmission configurations;

wherein, the multiple transmission configurations are associated with configuration information of the activation/deactivation information, a first field of the activation/deactivation information is used for indicating activation/deactivation of first configuration information that is same among the multiple transmission configurations.

The first field is used for at least one of the following:

indicating a bitmap of a correspondence relationship between configuration indexes corresponding to the multiple transmission configurations and bits, wherein the bits correspond to the configuration indexes in a one-to-one manner;

indicating a first configuration index group, wherein the first configuration index group includes configuration indexes of the multiple transmission configurations;

indicating a serial number of a second configuration index group, wherein the second configuration index group includes configuration indexes of the multiple transmission configurations;

indicating a configuration index corresponding to an initial transmission configuration among the multiple transmission configurations arranged in sequence;

indicating a configuration index corresponding to an initial transmission configuration among the multiple transmission configurations arranged in sequence and a quantity of the multiple transmission configurations; or indicating a serial number of a first element in a configuration index set, wherein the first element in the configuration index set corresponds to a configuration index of an initial transmission configuration among the multiple transmission configurations arranged in sequence and a quantity of the multiple transmission configurations.

The multiple transmission configurations are transmission configurations associated with a first search space (SS) or the a first control resource set (CORESET) in configuration information of the activation/deactivation information;

the first SS is an SS where the activation/deactivation information is detected, and the first CORESET is a CORESET where the activation/deactivation information is detected.

The activation information used for indicating activation of the multiple transmission configurations includes a second field, and the second field is used for indicating activation of a second configuration information that is different among the multiple transmission configurations.

The second configuration information includes at least one of the following:

de-modulation reference signal (DMRS) configuration information;
a time domain offset;
a relative time domain offset; or
a hybrid automatic repeat request (HARD) process number offset.

The second field is used for at least one of the following:

indicating second configuration information corresponding respectively to the multiple transmission configurations that are activated;

indicating a serial number of a first configuration information group, wherein, the first configuration information group includes second configuration information of the multiple transmission configurations;

indicating second configuration information of a first transmission configuration that is activated, wherein the first transmission configuration is a first one of the multiple transmission configurations that are activated and arranged in sequence;

indicating second configuration information of a first transmission configuration and offsets of the multiple transmission configurations; or indicating a serial number of a first element in a configuration information set, wherein the first element in the configuration information set corresponds to second configuration information of the first transmission configuration and offsets of the multiple transmission configurations.

The first field or the second field or a verification field in the activation/deactivation information is at least one of following items in downlink control information DCI:

an HARQ process number field;
a DMRS configuration field
a time domain resource assignment (TDRA) field;
a frequency domain resource assignment (FDRA) field;
a redundancy version (RV) field;
a transmit power control (TPC) field;
a most significant bit (MSB) in modulation and coding scheme (MCS);
a modulation and coding scheme (MCS) field; or
a padding bit field of a predetermined length.

In a third aspect, some embodiments of the present disclosure further provide a network device, including:

a transmitting module, configured to transmit, to a terminal, activation/deactivation information for indicating activation/deactivation of multiple transmission configurations;

wherein, the multiple transmission configurations are associated with configuration information of the activation/deactivation information, or a first field of the activation/deactivation information is used for indicating activation/deactivation of first configuration information that is same among the multiple transmission configurations.

In a fourth aspect, some embodiments of the present disclosure further provide an configuration activation/deactivation method, including:
receiving activation/deactivation information for indicating activation/deactivation of multiple transmission configurations that is transmitted by a network device; wherein, the multiple transmission configurations are associated with configuration information of the activation/deactivation information, or a first field of the activation/deactivation information is used for indicating activation/deactivation of first configuration information that is same among the multiple transmission configurations;
activating/deactivating the multiple transmission configurations according to the activation/deactivation information.

The first field is used for at least one of the following:
indicating a bitmap of a correspondence relationship between configuration indexes corresponding to the multiple transmission configurations and bits, wherein the bits correspond to the configuration indexes in a one-to-one manner;
indicating a first configuration index group, wherein the first configuration index group includes configuration indexes of the multiple transmission configurations;
indicating a serial number of a second configuration index group, wherein the second configuration index group includes configuration indexes of the multiple transmission configurations;
indicating the configuration index corresponding to an initial transmission configuration among the multiple transmission configurations arranged in sequence;
indicating the configuration index corresponding to the initial transmission configuration among the multiple transmission configurations arranged in sequence and a quantity of the multiple transmission configurations;
indicating a serial number of a first element in a configuration index set, wherein the first element in the configuration index set corresponds to the configuration index of the initial transmission configuration among the multiple transmission configurations arranged in sequence and the quantity of the multiple transmission configurations.

The multiple transmission configurations are transmission configurations associated with a first search space (SS) or a first control resource set (CORESET) in configuration information of the activation/deactivation information;
the first SS is an SS where the activation/deactivation information is detected, and the first CORESET is a CORESET where the activation/deactivation information is detected.

The activation information used for indicating activation of the multiple transmission configurations includes a second field, and the second field is used for indicating activation of second configuration information that is different among the multiple transmission configurations.

The second configuration information includes at least one of the following:
de-modulation reference signal (DMRS) configuration information;
a time domain offset;
a relative time domain offset; or
a hybrid automatic repeat request (HARQ) process number offset.

The second field is used for at least one of the following:
indicating second configuration information corresponding respectively to the multiple transmission configurations that are activated;
indicating a serial number of a first configuration information group, wherein, the first configuration information group includes second configuration information of the multiple transmission configurations;
indicating second configuration information of a first transmission configuration that is activated, wherein the first transmission configuration is a first one of the multiple transmission configurations that are activated and arranged in sequence;
indicating second configuration information of the first transmission configuration and offsets of the multiple transmission configurations; or
indicating a serial number of a first element in a configuration information set, wherein the first element in the configuration information set corresponds to second configuration information of the first transmission configuration and offsets of the multiple transmission configurations.

The first field or the second field or a verification field in the activation/deactivation information is at least one of following items in downlink control information DCI:
an HARQ process number field;
a DMRS configuration field;
a time domain resource assignment (TDRA) field;
a frequency domain resource assignment (FDRA) field;
a redundancy version (RV) field;
a transmit power control (TPC) field;
a most significant bit (MSB) in modulation and coding scheme (MCS);
a modulation and coding scheme (MCS) field; or
a padding bit field of a predetermined length.

In a fifth aspect, some embodiments of the present disclosure further provide a terminal, including: a transceiver, a memory, a processor, and a program stored in the memory and configured to be executed by the processor, wherein the processor is configured to execute the program to implement following steps:
receiving activation/deactivation information for indicating activation/deactivation of multiple transmission configurations that is transmitted by a network device; wherein, the multiple transmission configurations are associated with configuration information of the activation/deactivation information, or a first field of the activation/deactivation information is used for indicating activation/deactivation of first configuration information that is same among the multiple transmission configurations;
activating/deactivating the multiple transmission configurations according to the activation/deactivation information.

The first field is used for at least one of the following:
indicating a bitmap of a correspondence relationship between configuration indexes corresponding to the multiple transmission configurations and bits, wherein the bits correspond to the configuration indexes in a one-to-one manner;
indicating a first configuration index group, wherein the first configuration index group includes configuration indexes of the multiple transmission configurations;

indicating a serial number of a second configuration index group, wherein the second configuration index group includes configuration indexes of the multiple transmission configurations;

indicating the configuration index corresponding to an initial transmission configuration among the multiple transmission configurations arranged in sequence;

indicating the configuration index corresponding to the initial transmission configuration among the multiple transmission configurations arranged in sequence and a quantity of the multiple transmission configurations; or indicating a serial number of a first element in a configuration index set, wherein the first element in the configuration index set corresponds to the configuration index of the initial transmission configuration among the multiple transmission configurations arranged in sequence and the quantity of the multiple transmission configurations.

The multiple transmission configurations are transmission configurations associated with a first search space (SS) or a first control resource set (CORESET) in configuration information of the activation/deactivation information;

the first SS is an SS where the activation/deactivation information is detected, and the first CORESET is a CORESET where the activation/deactivation information is detected.

The activation information used for indicating activation of the multiple transmission configurations includes a second field, and the second field is used for indicating activation of second configuration information that is different among the multiple transmission configurations.

The second configuration information includes at least one of the following:

de-modulation reference signal (DMRS) configuration information;

a time domain offset;

a relative time domain offset; or a hybrid automatic repeat request (HARD) process number offset.

The second field is used for at least one of the following:

indicating second configuration information corresponding respectively to the multiple transmission configurations that are activated.

indicating a serial number of a first configuration information group, wherein the first configuration information group includes second configuration information of the multiple transmission configurations;

indicating second configuration information of a first transmission configuration that is activated, wherein the first transmission configuration is a first one of the multiple transmission configurations that are activated and arranged in sequence;

indicating second configuration information of the first transmission configuration and offsets of the multiple transmission configurations; or indicating a serial number of a first element in a configuration information set, wherein the first element in the configuration information set corresponds to the second configuration information of the first transmission configuration and the offsets of the multiple transmission configurations.

The first field or the second field or a verification field in the activation/deactivation information is at least one of following items in downlink control information DCI:

an HARQ process number field;
a DMRS configuration field;
a time domain resource assignment (TDRA) field;
a frequency domain resource assignment (FDRA) field;
a redundancy version (RV) field;
a transmit power control (TPC) field;
a most significant bit (MSB) in modulation and coding scheme (MCS);
a modulation and coding scheme (MCS) field; or
a padding bit field of a predetermined length.

In a sixth aspect, some embodiments of the present disclosure further provide a terminal, including:

a receiving module, configured to receive activation/deactivation information for indicating activation/deactivation of multiple transmission configurations that is transmitted by a network device; wherein, the multiple transmission configurations are associated with configuration information of the activation/deactivation information, or a first field of the activation/deactivation information is used for indicating activation/deactivation of first configuration information that is same among the multiple transmission configurations;

an activating/deactivating module, used to activate/deactivate the multiple transmission configurations according to the activation/deactivation information.

In a seventh aspect, some embodiments of the present disclosure further provide a computer-readable storage medium storing thereon a computer program, the computer program is configured to be executed by a processor to implement the steps of the above-mentioned configuration activation/deactivation methods.

The beneficial effects of the technical solutions of the present disclosure are: activation/deactivation information for indicating activation/deactivation of multiple transmission configurations is transmitted to a terminal; wherein the multiple transmission configurations are associated with the configuration information of the activation/deactivation information, or a first field of the activation/deactivation information is used for indicating activation/deactivation of first configuration information that is same among the multiple transmission configurations, thus multiple transmission configurations can be activated by a single piece of activation/deactivation information, and the problem of large overhead and high latency when multiple transmission configurations are activated is solved.

BRIEF DESCRIPTION OF THE DRAWINGS

FIG. 1 illustrates a flowchart of an configuration activation/deactivation method on a network device side according to some embodiments of the present disclosure;

FIG. 2 illustrates a block diagram of a network device according to some embodiments of the present disclosure;

FIG. 3 illustrates a structure diagram of a network device according to some embodiments of the present disclosure;

FIG. 4 illustrates a flowchart of an configuration activation/deactivation method on a terminal side according to some embodiments of the present disclosure;

DETAILED DESCRIPTION

Figure 5:
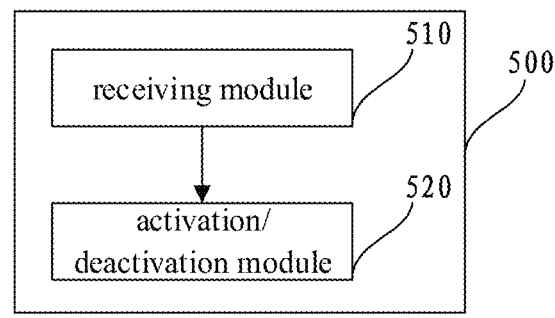
FIG. 5 illustrates a block diagram of a terminal according to some embodiments of the present disclosure.

In order to make the technical problem to be solved, the technical solutions and advantages of the present disclosure clearer, the present disclosure will be described in detail below with reference to the drawings and specific embodiments. In the following description, specific details such as specific configurations and specific details of components are provided only to facilitate a comprehensive understanding of the embodiments of the present disclosure. Therefore, it should be clear to those skilled in the art that various changes and modifications can be made to the embodiments described herein without departing from the scope and spirit of the present disclosure. In addition, for clarity and conciseness, descriptions of known functions and structures are omitted.

It should be understood that "one embodiment" or "an embodiment" mentioned throughout the present disclosure means that a specific feature, structure, or characteristic related to the embodiment is included in at least one embodiment of the present disclosure. Therefore, "in one embodiment" or "in an embodiment" in various places throughout the present disclosure do not necessarily refer to the same embodiment. In addition, these specific features, structures, or characteristics can be combined in one or more embodiments in any suitable manner.

In the various embodiments of the present disclosure, it should be understood that the sequence number of the following processes does not imply the order of execution. The execution order of each process should be determined by its function and inherent logic. The sequence number of the following processes does not constitute any limitation on the implementation process of the embodiments of the present disclosure.

In addition, the terms "system" and "network" in the present disclosure are often used interchangeably in the present disclosure.

In the embodiments provided in the present disclosure, it should be understood that "B corresponding to A" means that B is associated with A, and B can be determined according to A. However, it should also be understood that determining B according to A does not mean that B is determined only according to A, rather, B can be determined according to A and/or other information.

In the embodiments of the present disclosure, the form of the access network is not limited, and may include a macro base station, pico base station, Node B (the nomenclature of a 3G mobile base station), evolved Node B (eNB), femto eNB or Home eNode B or Home eNB or HeNB, relay station, access point, remote radio unit (RRU), remote radio head (RRH) or the like. The user terminal can be a mobile phone (or cell phone), or other equipment capable of transmitting or receiving wireless signals, including user equipment, personal digital assistant (PDA), wireless modem, wireless communication device, handheld device, laptop computer, cordless phone, wireless local loop (WLL) station, customer premise equipment (CPE) that can convert mobile signals into wireless fidelity (WiFi) signals, or mobile smart hotspot, smart home appliance, or other devices that can spontaneously communicate with the mobile communication network without human operation.

Specifically, embodiments of the present disclosure provide an information transmission method, which solves the problems in the related art that activation of configuration when information is transmitted results in large overhead and high latency.

As shown in FIG. 1, embodiments of the present disclosure provide an configuration activation/deactivation method, which specifically includes:

step 11: transmitting, to a terminal, activation/deactivation information for indicating activation/deactivation of multiple transmission configurations.

The multiple transmission configurations are associated with configuration information of the activation/deactivation information, or a first field of the activation/deactivation information is used for indicating activation/deactivation of first configuration information that is same among the multiple transmission configurations.

Optionally, the transmission configuration is used for uplink data transmission or downlink data transmission.

Optionally, the activation/deactivation information can be uplink control information or downlink control information. That is, the configuration activation/deactivation method in some embodiments of the present disclosure can be applied to activation/deactivation of the transmission configuration of uplink data transmission, and it can also be applied to activation/deactivation of the transmission configuration of downlink data transmission.

In this embodiment, activation/deactivation information for indicating activation/deactivation of multiple transmission configurations is transmitted to a terminal; wherein the multiple transmission configurations are associated with the configuration information of the activation/deactivation information, or a first field of the activation/deactivation information is used for indicating activation/deactivation of first configuration information that is same among the multiple transmission configurations, thus multiple transmission configurations can be activated by a single piece of activation/deactivation information, and the problem of large overhead and high latency when multiple transmission configurations are activated is solved.

As an implementation, a first field is used for indicating activation of first configuration information that is same among the multiple transmission configurations.

Optionally, when the activation/deactivation information is downlink control information (DCI), the first field may be a newly added field in DCI, or may be one of the following items in DCI:

a hybrid automatic repeat request (HARD) process number field;

a de-modulation reference signal (DMRS) configuration field;

a time domain resource assignment (TDRA) field;

a frequency domain resource assignment (FDRA) field;

a redundancy version (RV) field;

a transmit power control (TPC) field;

a most significant bit (MSB) in modulation and coding scheme (MCS);

an MCS field; or a padding bit field of a predetermined length.

The first field is used for at least one of the following:

indicating a bitmap of a correspondence relationship between configuration indexes corresponding to the multiple transmission configurations and bits, wherein the bits correspond to the configuration indexes in a one-to-one manner;

indicating a first configuration index group, wherein the first configuration index group includes configuration indexes of the multiple transmission configurations;

indicating a serial number of a second configuration index group, wherein the second configuration index group includes configuration indexes of the multiple transmission configurations;

indicating a configuration index corresponding to an initial transmission configuration among the multiple transmission configurations arranged in sequence;

indicating a configuration index corresponding to an initial transmission configuration among the multiple transmission configurations arranged in sequence and a quantity of the multiple transmission configurations; or indicating a serial number of a first element in a configuration index set, wherein the first element in the configuration index set corresponds to a configuration index of an initial transmission configuration among the multiple transmission configurations arranged in sequence and a quantity of the multiple transmission configurations.

Manners of indicating the first field are described hereinafter.

Manner 1: the first field is used for indicating a bitmap of a correspondence relationship between configuration indexes corresponding to the multiple transmission configurations and bits; wherein the bits correspond to the configuration indexes in a one-to-one manner.

Specifically, the first field may be in the form of a bitmap. One bit in the bitmap corresponds to one transmission configuration, for example, a transmission configuration is identified by a configuration index, then the bit being 1 denotes that the corresponding transmission configuration is activated, and the bit being 0 denotes that the corresponding transmission configuration is not activated.

Manner 2: the first field is used for indicating a first configuration index group; the first configuration index group includes configuration indexes of the multiple transmission configurations.

Specifically, the first field may be used for indicating a first configuration index group among multiple configuration index groups, where one configuration index group includes multiple configuration indexes, that is, one configuration index group includes at least two configuration indexes. For example, in the radio resource control (RRC) signalling of each transmission configuration, in addition to the configuration index corresponding to the transmission configuration, there is also an activation index field. The transmission configuration whose activation index field in the RRC signalling is consistent with the first field in the activation information will be activated. In addition, the deactivation method is the same as the above method, which will not be repeated here.

Manner 3: the first field is used for indicating a serial number of a second configuration index group; the second configuration index group includes configuration indexes of the multiple transmission configurations.

Specifically, multiple configuration index groups may be pre-configured through RRC signalling, and each configuration index group includes at least one configuration index; different configuration index groups have different combinations of configuration indexes. The first field is used for indicating a serial number of a second configuration index group in the multiple configuration index groups, so that the transmission configurations corresponding to all the configuration indexes in the configuration index group corresponding to the serial number of the second configuration index group may be activated/deactivated.

In addition, a configuration index list can also be pre-configured through RRC, and each row of the configuration index list contains at least one configuration index; different rows of the configuration index list have different combinations of configuration indexes. The first field is used for indicating the first serial number in the configuration index list, that is, row number, so that the transmission configurations corresponding to all the configuration indexes included in the row may be activated/deactivated.

Manner 4: the first field is used for indicating a configuration index corresponding to an initial transmission configuration among the multiple transmission configurations arranged in sequence.

Specifically, the first field is used for indicating an initial first configuration index, so that the transmission configurations corresponding to consecutively arranged N configuration indexes starting from the first configuration index are activated. N is a positive integer. N can be pre-set, or pre-configured through RRC signalling. For example, when the configuration index indicated by the first field is 2, and the pre-set or RRC configured N is 4, then the actually activated/deactivated transmission configurations are four transmission configurations with configuration indexes 2, 3, 4, and 5.

Manner 5: the first field is used for indicating a configuration index corresponding to an initial transmission configuration in the multiple transmission configurations arranged in sequence and a quantity of the multiple transmission configurations.

The first field may also be used for indicating an initial second configuration index and a quantity N of configuration indexes, so that the transmission configurations corresponding to consecutively arranged N configuration indexes starting from the second configuration index are activated/deactivated. For example, when the configuration index indicated by the first field is 2 and the quantity of configuration indexes is 4, then the actually activated/deactivated transmission configuration are four transmission configurations with configuration indexes 2, 3, 4, and 5.

Manner 6: the first field is used for indicating a serial number of a first element in a configuration index set; the first element in the configuration index set corresponds to a configuration index of an initial transmission configuration among the multiple transmission configurations arranged in sequence and a quantity of the multiple transmission configurations.

Specifically, a configuration index set can be pre-set or pre-configured through RRC, and one element in the configuration index set corresponds to one vector (an initial third configuration index, a quantity M of configuration indexes); different elements in the configuration index set correspond to different respective combinations of the initial third configuration index and the quantity of configuration indexes, that is, arbitrary combinations of different initial third configuration indexes and different quantities of configuration indexes constitute the configuration index set. The configuration index set can be tailored. M is a positive integer.

The first field is used for indicating a serial number of the first element in the configuration index set, so that all transmission configurations corresponding to the element corresponding to the serial number are activated, that is, the transmission configurations corresponding to consecutively arranged M configuration indexes starting from the third configuration index that correspond to the element are activated. In addition, the deactivation method is the same as the above method, which will not be repeated here.

As another implementation, activation/deactivation information for indicating activation/deactivation of multiple transmission configurations is transmitted to a terminal; the multiple transmission configurations are associated with configuration information of the activation/deactivation information.

Specifically, the multiple transmission configurations are transmission configurations associated with a first search space (SS) or a first control resource set (CORESET) in configuration information of the activation/deactivation information; the first SS is an SS where the activation/deactivation information is detected, and the first CORESET is a CORESET where the activation/deactivation information is detected.

For example, the activation/deactivation information may be DCI, and configuration information of DCI includes SS, CORESET and the like in DCI. The transmission configuration to be activated/deactivated can be determined according to a correspondence relationship between SSs or CORESETs and configuration indexes. The correspondence relationship between SSs or CORESETs and configuration indexes may be configured through RRC, and one SS or CORESET may correspond to one or more configuration indexes. When the DCI is detected in the first SS or the first CORESET, it is determined that the transmission configuration corresponding to the configuration index corresponding to the first SS or the first CORESET is activated/deactivated.

The following takes CORESET as an example for specific description:

Example 1: the configuration information of DCI includes two CORESETs: CORESET 1 and CORESET 2. It is pre-set that a configuration index 1 corresponds to the CORESET 1, and a configuration index 2 corresponds to the CORESET 2. If activation/deactivation information, i.e., DCI, is detected in CORESET 1, then the activated/deactivated configuration is the transmission configuration corresponding to the configuration index 1; if activation/deactivation information, i.e., DCI, is detected in CORESET 2, then the activated/deactivated configuration is the transmission configuration corresponding to the configuration index 2.

Example 2: it is pre-set that configuration indexes 1, 2, 3, 4 correspond to CORESET 1, and configuration indexes 5, 6 correspond to CORESET 2. If activation/deactivation information, i.e., DCI, is detected in CORESET 1, then the activated/deactivated configurations are the transmission configurations corresponding to configuration indexes 1, 2, 3, 4 respectively; if activation/deactivation information, i.e., DCI, is detected in CORESET 2, then the activated/deactivated configurations are the transmission configurations corresponding to configuration indexes 5, 6 respectively.

Further, in the case of activating multiple transmission configurations in the above manners, the activation information used for indicating activation of the multiple transmission configurations includes a second field, and the second field is used for indicating activation of second configuration information that is different among the multiple transmission configurations.

The second configuration information includes at least one of the following:
  DMRS configuration information;
  a time domain offset;
  a relative time domain offset; or
  an HARQ process number offset.

Optionally, in the case that the activation/deactivation information is DCI, the first field may be a newly added field in DCI or one of following items in DCI:
  an HARQ process number field;
  a DMRS configuration field;
  a TDRA field;
  an FDRA field;
  an RV field;
  a TPC field;
  an MSB in MCS;
  an MCS field; or
  a padding bit field of a predetermined length.

The second field is used for at least one of the following:
  indicating second configuration information corresponding respectively to the multiple transmission configurations that are activated;
  indicating a serial number of a first configuration information group, wherein the first configuration information group includes second configuration information of the multiple transmission configurations;
  indicating second configuration information of a first transmission configuration that is activated; the first transmission configuration is a first one of the multiple transmission configurations that are activated and arranged in sequence;
  indicating second configuration information of a first transmission configuration and offsets of the multiple transmission configurations; or
  indicating a serial number of a first element in a configuration information set; the first element in the configuration information set corresponds to second configuration information of the first transmission configuration and offsets of the multiple transmission configurations.

The indication manners of the second field are described hereinafter.

Manner 1: the second field is used for indicating second configuration information corresponding respectively to the multiple activated transmission configurations.

For example, three transmission configurations are: transmission configuration 1, transmission configuration 2, and transmission configuration 3; the second field is used to directly indicate activation of second configuration information 1 of the transmission configuration 1, second configuration information 2 of the transmission configuration 2, and second configuration information 3 of the transmission configuration 3. In addition, an independent indication field may be provided for each activated configuration to indicate the second configuration information, and the total field length is determined by a maximum quantity of transmission configurations corresponding to one first field.

Manner 2: the second field is used for indicating a serial number of a first configuration information group; wherein, the first configuration information group includes second configuration information of the multiple transmission configurations.

Specifically, multiple configuration information groups may be pre-set through RRC, and each configuration information group includes multiple second configuration information. The second field is used for indicating a serial number of a first configuration information group, so that second configuration information corresponding to the first configuration information group in the multiple transmission configurations may be activated.

Manner 3: the second field is used for indicating second configuration information of the activated first transmission configuration; the first transmission configuration is the first one of the activated multiple transmission configurations arranged in sequence.

Specifically, the second field is used for indicating the first transmission configuration of the activated multiple transmission configurations arranged in sequence, so that the second configuration information of the multiple transmission configurations is activated starting from the first transmission configuration and according to the offsets of the multiple transmission configurations. The offsets of the multiple transmission configurations may be pre-set, or pre-configured through RRC signalling.

Manner 4: the second field is used for indicating second configuration information of the first transmission configuration and the offsets of the multiple transmission configurations.

Specifically, the second field is used for indicating the first transmission configuration of the activated multiple transmission configurations arranged in sequence, so that the second configuration information of the multiple transmission configurations is activated starting from the first transmission configuration and according to the offsets of the multiple transmission configurations.

Manner 5: the second field is used for indicating a serial number of a first element in the configuration information set; the first element in the configuration information set corresponds to the second configuration information of the first transmission configuration and the offsets of the multiple transmission configurations.

Specifically, a configuration information set can be pre-set, or preconfigured through RRC, and one element in the configuration information set corresponds to one vector (the second configuration information of the initial first transmission configuration, the offsets of the multiple transmission configurations). Different elements in the configuration information set correspond to different respective combinations of the second configuration information of the initial first transmission configuration and the offsets of the multiple transmission configurations.

The second field is used for indicating a serial number of a first element in the configuration information set, so that the second configuration information of the multiple transmission configurations is activated starting from the first transmission configuration corresponding to the serial number of the first element and according to the offsets of the multiple transmission configurations.

The indication manners of the second field are described below with specific examples.

Example 1: The Second Field is Used for Indicating Activation of DMRS Information of the Multiple Transmission Configurations Specifically, the second field may be used for directly indicating the DMRS information corresponding respectively to the multiple transmission configurations, for example, it is pre-set that DMRSs of the first transmission configuration to the Nth transmission configuration in the multiple (N) transmission configurations are arranged in sequence; or the second field directly indicates the DMRS information of each configuration, such as antenna port, and the total field length is determined by the maximum quantity of transmission configurations corresponding to the first field.

The second field may also be used for indicating a serial number of a first configuration information group, wherein the first configuration information group includes DMRS information of the multiple transmission configurations. For example, multiple DMRS information groups of the first transmission configuration to the Nth transmission configuration are defined in the RRC signalling. The second field is used for indicating the use of the DMRS information group.

The second field can also be used for indicating DMRS information of a first transmission configuration among the activated multiple transmission configurations arranged in sequence and a quantity of configurations. For example, if the second field indicates an antenna port 2 and 4 configurations, then the DMRSs of the 4 activated configurations are antenna ports 2, 3, 4, and 5. Of course, the manner of using the second field to indicate activation of the DMRS information of the multiple transmission configurations may be any one of the above mentioned second field indication manners, which will not be repeated here.

Example 2: The Second Field is Used for Indicating Activation of Time Domain Offsets of the Multiple Transmission Configurations Specifically, multiple groups of time domain offsets of the first transmission configuration to the Nth transmission configuration are configured in RRC signalling, and the unit of the offset is transmission opportunity (TO) or time domain symbol (OFDM) or slot etc. For example, a time domain offset group can be {0 1 2 3 4 5 6 7}, {0 2 4 6}, {0 1 2 3}, {0 4 5 6 7}, etc., which allows for sufficient flexibility. The second field can be used for indicating the serial number of the time domain offset group.

The second field may also be used for directly indicating a basic offset value, and the actual offsets corresponding respectively to the multiple transmission configurations may be obtained by multiplying the configuration indexes of the transmission configurations and the basic offset value. Of course, the manner of using the second field to indicate the activation of the time domain offsets of the multiple transmission configurations may be any one of the above mentioned second field indication manners, which will not be repeated here.

The indication manners of the first field and the second field are described below with specific examples.

Example 1: the activation information is DCI. The first field of DCI (for example, activation index field) has 16 bits which correspond to the configuration index 1~16 respectively, and no more configurations can be configured. The first field can be in the form of a bitmap. One bit in the bitmap corresponds to one transmission configuration, for example, a transmission configuration is identified by a configuration index, the bit being 1 denotes that the corresponding transmission configuration is activated, and the bit being 0 denotes that the corresponding transmission configuration is not activated.

The second field (for example, DMRS pattern field) has 5 bits, indicating 32 DMRS patterns. Among the 32 DMRS patterns, the following cases may exist: some patterns only contain one DMRS configuration, which are used in the situation where only one bit in the first field is 1; some patterns only contain two DMRS configurations, which are used in the situation where 2 bits in the first field are 1; some patterns only contain 16 DMRS configurations, which are used in the situation where the 16 bits in the first field are 1. Similarly, the time domain offset pattern can be designed in the same way as the DMRS pattern.

Example 2: the first field (for example, activation index field) may also be used for indicating one of multiple transmission configuration index groups. For example, in RRC signalling of each transmission configuration, in addition to the configuration index, there is also an activation index field. 4 bits in DCI are used for indicating one activation index. Each transmission configuration whose activation index in RRC signalling is consistent with the activation index indicated in the activation information will be activated.

The second field (for example, DMRS pattern field) has 5 bits, indicating 32 DMRS patterns. Among the 32 DMRS patterns, the length of each pattern is 16, corresponding to 16 DMRSs. For the multiple transmission configurations that are indicated by the first field to be activated, in the ascending order of the configuration indexes, the DMRSs corresponding respectively to the multiple transmission configurations are taken sequentially from the pattern indicated by the second field; similarly, the time domain offset pattern can be designed in the same way as the DMRS pattern.

Example 3: the first field (for example, activation index field) indicates one initial configuration index, and at the same time indicates a quantity of activated transmission configurations. It is determined that multiple consecutively numbered configuration indexes starting with the indicated configuration index are activated. The quantity of activated transmission configurations may be indicated by the bit field in the activation information, may be pre-set, or may be pre-configured through RRC. For example, when the configuration index is 2 and the quantity of activated configurations is 4, then the configuration indexes of actually activated transmission configurations are 2, 3, 4, and 5.

The second field can indicate DMRS configuration information of a first configuration, and according to the quantity of activated transmission configurations, the DMRSs of the transmission configurations are obtained. For example, it is indicated that the DMRS configuration information of the first configuration is antenna port 2 and there are 4 configurations, then the DMRSs of the 4 activated configurations are antenna ports 2, 3, 4, and 5. Similarly, the time domain offset pattern can be designed in the same way as the DMRS pattern.

It should be noted that the above examples are all illustrative, and the above indication manners of the first field and the above indication manners of the second field may be combined, and the present disclosure is not limited thereto.

The above embodiment introduces a configuration activation/deactivation method on a network device side of the present disclosure. The following embodiment will further describe its corresponding network device with reference to the drawings.

Specifically, as shown in FIG. 2, some embodiments of the present disclosure provide a network device 200, including:

a transmitting module 210, configured to transmit, to a terminal, activation/deactivation information for indicating activation/deactivation of multiple transmission configurations;

wherein, the multiple transmission configurations are associated with configuration information of the activation/deactivation information, or a first field of the activation/deactivation information is used for indicating activation/deactivation of first configuration information that is same among the multiple transmission configurations.

Optionally, the first field is used for at least one of the following:

indicating a bitmap of a correspondence relationship between configuration indexes corresponding to the multiple transmission configurations and bits; wherein the bits correspond to the configuration indexes in a one-to-one manner;

indicating a first configuration index group; the first configuration index group includes configuration indexes of the multiple transmission configurations;

indicating a serial number of a second configuration index group; the second configuration index group includes configuration indexes of the multiple transmission configurations;

indicating a configuration index corresponding to an initial transmission configuration among the multiple transmission configurations arranged in sequence;

indicating a configuration index corresponding to an initial transmission configuration among the multiple transmission configurations arranged in sequence and a quantity of the multiple transmission configurations; or indicating a serial number of a first element in a configuration index set; the first element in the configuration index set corresponds to a configuration index of an initial transmission configuration among the multiple transmission configurations arranged in sequence and a quantity of the multiple transmission configurations.

Optionally, the multiple transmission configurations are transmission configurations associated with a first search space (SS) or a first control resource set (CORESET) in configuration information of the activation/deactivation information;

the first SS is an SS where the activation/deactivation information is detected, and the first CORESET is a CORESET where the activation/deactivation information is detected.

Optionally, the activation information used for indicating activation of the multiple transmission configurations includes a second field, and the second field is used for indicating activation of second configuration information that is different among the multiple transmission configurations.

Optionally, the second configuration information includes at least one of the following:

de-modulation reference signal (DMRS) configuration information;

a time domain offset;

a relative time domain offset; or a hybrid automatic repeat request (HARQ) process number offset.

Optionally, the second field is used for at least one of the following:

indicating second configuration information corresponding respectively to the multiple transmission configurations that are activated;

indicating a serial number of a first configuration information group; wherein, the first configuration information group includes second configuration information of the multiple transmission configurations;

indicating second configuration information of a first transmission configuration that is activated; the first transmission configuration is a first one of the multiple transmission configurations that are activated and arranged in sequence;

indicating second configuration information of a first transmission configuration and offsets of the multiple transmission configurations; or indicating a serial number of a first element in a configuration information set; the first element in the configuration information set corresponds to second configuration information of the first transmission configuration and offsets of the multiple transmission configurations.

Optionally, the first field or the second field or a verification field in the activation/deactivation information is at least one of following items in downlink control information DCI:

an HARQ process number field;
a DMRS configuration field;
a time domain resource assignment (TDRA) field;
a frequency domain resource assignment (FDRA) field;
a redundancy version (RV) field;
a transmit power control (TPC) field;
a most significant bit (MSB) in modulation and coding scheme (MCS);
a modulation and coding scheme (MCS) field; or
a padding bit field of a predetermined length.

The network device embodiment of the present disclosure corresponds to the embodiment of the foregoing method, and all the implementations in the foregoing method embodiments are applicable to the network device embodiment, and the same technical effect can also be achieved.

According to the network device 200 in some embodiments of the present disclosure, activation/deactivation information for indicating activation/deactivation of multiple transmission configurations is transmitted to a terminal; wherein the multiple transmission configurations are associated with the configuration information of the activation/deactivation information, or a first field of the activation/deactivation information is used for indicating activation/deactivation of first configuration information that is same among the multiple transmission configurations, thus multiple transmission configurations can be activated by a single piece of activation/deactivation information, and the problem of large overhead and high latency when multiple transmission configurations are activated is solved.

In order to better achieve the above objective, as shown in FIG. 3, the present disclosure further provides a network device, the network device includes: a processor 300; a memory 320 connected to the processor 300 through a bus interface, and a transceiver 310 connected to the processor 300 through the bus interface; the memory 320 is used to store programs and data used by the processor when performing operations; the transceiver 310 is used to transmit data information or pilots, and also used to receive uplink control channel; when the processor 300 calls and executes the programs and data stored in the memory 320, the following functions are realized.

The processor 300 is configured to read the program in the memory 320 and execute the following process:
transmitting, to a terminal, activation/deactivation information for indicating activation/deactivation of multiple transmission configurations;
wherein, the multiple transmission configurations are associated with configuration information of the activation/deactivation information, or a first field of the activation/deactivation information is used for indicating activation/deactivation of first configuration information that is same among the multiple transmission configurations.

The first field is used for at least one of the following:
indicating a bitmap of a correspondence relationship between configuration indexes corresponding to the multiple transmission configurations and bits; wherein the bits correspond to the configuration indexes in a one-to-one manner;
indicating a first configuration index group; the first configuration index group includes configuration indexes of the multiple transmission configurations;
indicating a serial number of a second configuration index group; the second configuration index group includes configuration indexes of the multiple transmission configurations;
indicating a configuration index corresponding to an initial transmission configuration among the multiple transmission configurations arranged in sequence;
indicating a configuration index corresponding to an initial transmission configuration among the multiple transmission configurations arranged in sequence and a quantity of the multiple transmission configurations; or
indicating a serial number of a first element in a configuration index set; the first element in the configuration index set corresponds to a configuration index of an initial transmission configuration among the multiple transmission configurations arranged in sequence and a quantity of the multiple transmission configurations.

The multiple transmission configurations are transmission configurations associated with a first search space (SS) or a first control resource set (CORESET) in configuration information of the activation/deactivation information;
the first SS is an SS where the activation/deactivation information is detected, and the first CORESET is a CORESET where the activation/deactivation information is detected.

The activation information used for indicating activation of the multiple transmission configurations includes a second field, and the second field is used for indicating activation of second configuration information that is different among the multiple transmission configurations.

The second configuration information includes at least one of the following:
de-modulation reference signal (DMRS) configuration information;
a time domain offset;
a relative time domain offset; or
a hybrid automatic repeat request (HARQ) process number offset.

The second field is used for at least one of the following:
indicating second configuration information corresponding respectively to the multiple transmission configurations that are activated;
indicating a serial number of a first configuration information group; wherein, the first configuration information group includes second configuration information of the multiple transmission configurations;
indicating second configuration information of a first transmission configuration that is activated; the first transmission configuration is a first one of the multiple transmission configurations that are activated and arranged in sequence;
indicating second configuration information of a first transmission configuration and offsets of the multiple transmission configurations; or
indicating a serial number of a first element in a configuration information set; the first element in the configuration information set corresponds to second configuration information of the first transmission configuration and offsets of the multiple transmission configurations.

The first field or the second field or a verification field in the activation/deactivation information is at least one of following items in downlink control information (DCI):
an HARQ process number field;
a DMRS configuration field;
a time domain resource assignment (TDRA) field;
a frequency domain resource assignment (FDRA) field;
a redundancy version (RV) field;
a transmit power control (TPC) field;
a most significant bit (MSB) in modulation and coding scheme (MCS);

a modulation and coding scheme (MCS) field; or a padding bit field of a predetermined length.

The transceiver 310 is configured to receive and transmit data under the control of the processor 300.

In FIG. 3, the bus architecture may include any number of interconnected buses and bridges, specifically various circuits such as one or more processors represented by the processor 300 and the memory represented by the memory 320 are connected together. The bus architecture can also connect various other circuits such as peripheral devices, voltage regulators, power management circuits, etc., which are all known in the field, and therefore, will not be further described herein. The bus interface provides the interface. The transceiver 310 may be a plurality of elements, that is, including a transmitter and a receiver, and provide a unit for communicating with various other devices on the transmission medium. The processor 300 is responsible for managing the bus architecture and general processing, and the memory 320 can store data used by the processor 300 when performing operations.

A person skilled in the art can understand that all or part of the steps in the above-mentioned embodiments can be implemented by hardware, or by a computer program instructing relevant hardware. The computer program includes instructions for performing parts or all of the steps of the above-mentioned method; and the computer program can be stored in a readable storage medium, and the storage medium can be any form of storage medium.

Some embodiments of the present disclosure further provide a computer-readable storage medium storing thereon a computer program. When the computer program is executed by a processor, each process of the above-mentioned information transmission method embodiment is realized, and the same technical effect can be achieved. In order to avoid repetition, a detailed description thereof is omitted. The computer-readable storage medium is, for example, a read-only memory (ROM), random access memory (RAM), magnetic disk, or optical disc, etc.

The configuration activation/deactivation method in some embodiments of the present disclosure is described above from the perspective of a network device side. A configuration activation/deactivation method on a terminal side will be further described below with reference to the drawing.

As shown in FIG. 4, some embodiments of the present disclosure provide a configuration activation/deactivation method. The method includes a step 41 and a step 42.

Step 41: receiving activation/deactivation information for indicating activation/deactivation of multiple transmission configurations that is transmitted by a network device.

The multiple transmission configurations are associated with configuration information of the activation/deactivation information, or a first field of the activation/deactivation information is used for indicating activation/deactivation of first configuration information that is same among the multiple transmission configurations.

Step 42: activating/deactivating the multiple transmission configurations according to the activation/deactivation information.

Optionally, the transmission configuration is used for uplink data transmission or downlink data transmission.

Optionally, the activation/deactivation information can be uplink control information or downlink control information, that is, the configuration activation/deactivation method in some embodiments of the present disclosure can be applied to activation/deactivation of the transmission configuration of uplink data transmission, and it can also be applied to activation/deactivation of the transmission configuration of downlink data transmission.

In this embodiment, activation/deactivation information for indicating activation/deactivation of multiple transmission configurations that is transmitted by a network device is received; wherein the multiple transmission configurations are associated with the configuration information of the activation/deactivation information, or a first field of the activation/deactivation information is used for indicating activation/deactivation of first configuration information that is same among the multiple transmission configurations, thus multiple transmission configurations can be activated by a single piece of activation/deactivation information, and the problem of large overhead and high latency when multiple transmission configurations are activated is solved.

As an implementation, a first field is used for indicating activation of the first configuration information that is same among the multiple transmission configurations.

Optionally, when the activation/deactivation information is downlink control information (DCI), the first field may be a newly added field in DCI, or it may be one of the following items in DCI:

a hybrid automatic repeat request (HARD) process number field;

a de-modulation reference signal (DMRS) configuration field;

a time domain resource assignment (TDRA) field;

a frequency domain resource assignment (FDRA) field;

a redundancy version (RV) field;

a transmit power control (TPC) field;

a most significant bit (MSB) in modulation and coding scheme (MCS);

an MCS field; or a padding bit field of a predetermined length.

The first field is used for at least one of the following:

indicating a bitmap of a correspondence relationship between configuration indexes corresponding to the multiple transmission configurations and bits; wherein the bits correspond to the configuration indexes in a one-to-one manner;

indicating a first configuration index group; the first configuration index group includes configuration indexes of multiple transmission configurations;

indicating a serial number of a second configuration index group; the second configuration index group includes configuration indexes of multiple transmission configurations;

indicating a configuration index corresponding to an initial transmission configuration among the multiple transmission configurations arranged in sequence;

indicating a configuration index corresponding to an initial transmission configuration among the multiple transmission configurations arranged in sequence and a quantity of the multiple transmission configurations; or indicating a serial number of a first element in a configuration index set; the first element in the configuration index set corresponds to the configuration index of an initial transmission configuration among the multiple transmission configurations arranged in sequence and a quantity of the multiple transmission configurations.

Specifically, for the specific indication manner of the first field, a reference can be made to the examples on the network device side, which will not be repeated here.

As another implementation, activation/deactivation information for indicating activation/deactivation of multiple transmission configurations is transmitted to a terminal; the multiple transmission configurations are associated with configuration information of the activation/deactivation information.

Specifically, the multiple transmission configurations are transmission configurations associated with a first search space (SS) or a first control resource set (CORESET) in configuration information of the activation/deactivation information; the first SS is an SS where the activation/deactivation information is detected, and the first CORESET is a CORESET where the activation/deactivation information is detected.

For example, the activation/deactivation information may be DCI, and configuration information of DCI includes SS, CORESET or the like in DCI. The transmission configuration to be activated/deactivated can be determined according to the correspondence relationship between SSs or CORESETs and configuration indexes. The correspondence relationship between SSs or CORESETs and configuration indexes may be configured through RRC, and one SS or CORESET may correspond to one or more configuration indexes. When the DCI is detected in the first SS or the first CORESET, it is determined that the transmission configuration corresponding to the configuration index corresponding to the first SS or the first CORESET is activated/deactivated.

For specific examples, a reference can be made to the examples on the network device side, which will not be repeated here.

Further, in the case of activating multiple transmission configurations in the above manner, the activation information used for indicating activation of the multiple transmission configurations includes a second field, and the second field is used for indicating activation of second configuration information that is different among the multiple transmission configurations.

The second configuration information includes at least one of the following:
DMRS configuration information;
a time domain offset;
a relative time domain offset; or
an HARQ process number offset.

Optionally, when the activation/deactivation information is DCI, the first field may be a newly added field in DCI or one of the following items in DCI:
an HARQ process number field;
a DMRS configuration field;
a TDRA field;
an FDRA field;
an RV field;
a TPC field;
an MSB in MCS;
an MCS field; or
a padding bit field of a predetermined length.

The second field is used for at least one of the following:
indicating second configuration information corresponding respectively to the multiple transmission configurations that are activated;
indicating a serial number of a first configuration information group; wherein, the first configuration information group includes second configuration information of the multiple transmission configurations;
indicating second configuration information of a first transmission configuration that is activated; the first transmission configuration is a first one of the multiple transmission configurations that are activated and arranged in sequence;
indicating second configuration information of a first transmission configuration and offsets of the multiple transmission configurations; or
indicating a serial number of a first element in a configuration information set; the first element in the configuration information set corresponds to second configuration information of the first transmission configuration and offsets of the multiple transmission configurations.

Specifically, for the indication manner of the second field, a reference can be made to the examples on the network device side, which will not be repeated here.

The following describes, in combination with uplink transmission, the configuration activation/deactivation method on a network device side and a terminal side.

Step 1: after a network device (gNB) establishes a connection with a terminal, the network device performs semi-static configuration of the type 2 uplink grant-free transmission for the terminal, the configuration information includes: resource configuration period, etc.

Step 2: the network device generates the first part of the activation information, namely, the first field and the second field; for example, frequency domain resource allocation, time domain resource allocation, MCS, etc., also including activation index, and/or, DMRS pattern, and/or, time domain offset pattern.

Step 3: the network device generates the second part of the activation information, namely, verification field.

Step 4: the network device uses CS-RNTI to scramble PDCCH and at the same time sets NDI field to 0.

Step 5: the network device transmits the generated PDCCH to activate the type 2 uplink grant-free transmission.

Step 6: the terminal receives the PDCCH, and descrambles the CRC check bit by using the CS-RNTI to check whether the NDI field is set to 0; after the above conditions are met, the terminal will further verify the verification field of the PDCCH according to the activation information.

Step 7: after verifying the activation information, the terminal obtains the signalling of the type 2 uplink grant-free transmission.

Step 8: after the configuration is activated, the network device and terminal can periodically use the configured time-frequency resources to perform data transmission. The terminal will periodically transmit data on the designated semi-statically scheduled resources, and the network equipment will periodically receive data on the designated semi-statically scheduled resources.

Step 9: after the type 2 grant-free uplink transmission is completed, the network device transmits deactivation information (release signalling), and after the terminal correctly detects and obtains the release signalling, the type 2 grant-free uplink transmission ends.

The above embodiments respectively introduce the configuration activation/deactivation method on a terminal side in the present disclosure. A corresponding terminal will be further described in the following embodiment with reference to the drawing.

As shown in FIG. 5, some embodiments of the present disclosure provide a terminal 500, including:
a receiving module 510, configured to receive activation/deactivation information for indicating activation/deactivation of multiple transmission configurations that is transmitted by a network device; wherein, the multiple transmission configurations are associated with configuration information of the activation/deactivation information, or a first field of the activation/deactivation information is used for indicating activation/deactivation of first configuration information that is same among the multiple transmission configurations;

an activation/deactivation module 520, configured to activate/deactivate the multiple transmission configurations according to the activation/deactivation information.

Optionally, the first field is used for at least one of the following:

indicating a bitmap of a correspondence relationship between configuration indexes corresponding to the multiple transmission configurations and bits; wherein the bits correspond to the configuration indexes in a one-to-one manner;

indicating a first configuration index group; the first configuration index group includes configuration indexes of the multiple transmission configurations;

indicating a serial number of a second configuration index group; the second configuration index group includes configuration indexes of the multiple transmission configurations;

indicating a configuration index corresponding to an initial transmission configuration among the multiple transmission configurations arranged in sequence;

indicating a configuration index corresponding to an initial transmission configuration among the multiple transmission configurations arranged in sequence and a quantity of the multiple transmission configurations; or indicating a serial number of a first element in a configuration index set; the first element in the configuration index set corresponds to a configuration index of an initial transmission configuration among the multiple transmission configurations arranged in sequence and a quantity of the multiple transmission configurations.

Optionally, the multiple transmission configurations are transmission configurations associated with a first search space (SS) or a first control resource set (CORESET) in configuration information of the activation/deactivation information;

the first SS is an SS where the activation/deactivation information is detected, and the first CORESET is a CORESET where the activation/deactivation information is detected.

Optionally, the activation information used for indicating activation of the multiple transmission configurations includes a second field, and the second field is used for indicating activation of second configuration information that is different among the multiple transmission configurations.

Optionally, the second configuration information includes at least one of the following:

de-modulation reference signal (DMRS) configuration information;

a time domain offset;

a relative time domain offset; or a hybrid automatic repeat request (HARQ) process number offset.

Optionally, the second field is used for at least one of the following:

indicating second configuration information corresponding respectively to the multiple transmission configurations that are activated.

indicating a serial number of a first configuration information group; wherein, the first configuration information group includes second configuration information of the multiple transmission configurations;

indicating second configuration information of a first transmission configuration that is activated; the first transmission configuration is a first one of the multiple transmission configurations that are activated and arranged in sequence;

indicating second configuration information of the first transmission configuration and offsets of the multiple transmission configurations; or indicating a serial number of a first element in a configuration information set; the first element in the configuration information set corresponds to second configuration information of the first transmission configuration and offsets of the multiple transmission configurations.

Optionally, the first field or the second field or a verification field in the activation/deactivation information is at least one of following items in downlink control information DCI:

an HARQ process number field;
a DMRS configuration field;
a time domain resource assignment (TDRA) field;
a frequency domain resource assignment (FDRA) field;
a redundancy version (RV) field;
a transmit power control (TPC) field;
a most significant bit (MSB) in modulation and coding scheme (MCS);
a modulation and coding scheme (MCS) field; or
a padding bit field of a predetermined length.

The terminal embodiment of the present disclosure corresponds to the embodiment of the above method, and all the implementations in the above method embodiment are applicable to the embodiment of the terminal, and the same technical effect can also be achieved.

According to the terminal 500 in some embodiments of the present disclosure, activation/deactivation information for indicating activation/deactivation of multiple transmission configurations that is transmitted by a network device is received; wherein the multiple transmission configurations are associated with the configuration information of the activation/deactivation information, or a first field of the activation/deactivation information is used for indicating activation/deactivation of first configuration information that is same among the multiple transmission configurations, thus multiple transmission configurations can be activated by a single piece of activation/deactivation information, and the problem of large overhead and high latency when multiple transmission configurations are activated is solved.

Figure 6:
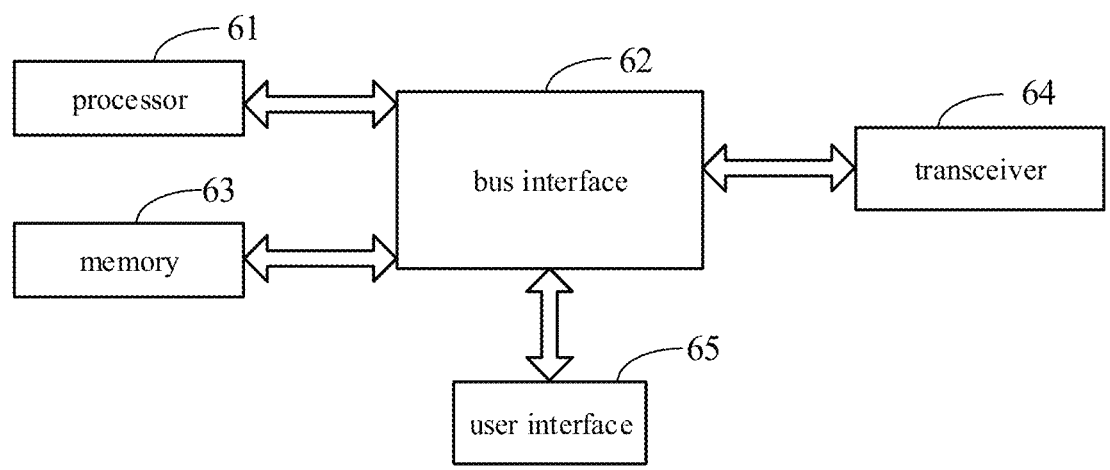
FIG. 6 illustrates a structure diagram of a terminal according to some embodiments of the present disclosure.

As shown in FIG. 6, this embodiment provides a terminal, including:

a processor 61; and a memory 63 connected to the processor 61 through a bus interface 62, and the memory 63 is used for storing programs and data used by the processor 61 when performing operations, when the processor 61 calls and executes the programs and data stored in the memory 63, following process is executed.

The transceiver 64 is connected to the bus interface 62 for receiving and transmitting data under the control of the processor 61.

The processor 61 executes the program to implements the following steps:

receiving activation/deactivation information for indicating activation/deactivation of multiple transmission configurations that is transmitted by a network device; wherein, the multiple transmission configurations are associated with configuration information of the activation/deactivation information, or a first field of the activation/deactivation information is used for indicating activation/deactivation of first configuration information that is same among the multiple transmission configurations; and activating/deactivating the multiple transmission configurations according to the activation/deactivation information.

The first field is used for at least one of the following:
indicating a bitmap of a correspondence relationship between configuration indexes corresponding to the multiple transmission configurations and bits; wherein the bits correspond to the configuration indexes in a one-to-one manner;
indicating a first configuration index group; the first configuration index group includes configuration indexes of the multiple transmission configurations;
indicating a serial number of a second configuration index group; the second configuration index group includes configuration indexes of the multiple transmission configurations;
indicating a configuration index corresponding to an initial transmission configuration among the multiple transmission configurations arranged in sequence;
indicating a configuration index corresponding to an initial transmission configuration among the multiple transmission configurations arranged in sequence and a quantity of the multiple transmission configurations; or
indicating a serial number of a first element in a configuration index set; the first element in the configuration index set corresponds to a configuration index of an initial transmission configuration among the multiple transmission configurations arranged in sequence and a quantity of the multiple transmission configurations.

The multiple transmission configurations are transmission configurations associated with a first search space (SS) or a first control resource set (CORESET) in configuration information of the activation/deactivation information;
the first SS is an SS where the activation/deactivation information is detected, and the first CORESET is a CORESET where the activation/deactivation information is detected.

The activation information used for indicating activation of the multiple transmission configurations includes a second field, and the second field is used for indicating activation of second configuration information that is different among the multiple transmission configurations.

The second configuration information includes at least one of the following:
de-modulation reference signal (DMRS) configuration information;
a time domain offset;
a relative time domain offset; or
a hybrid automatic repeat request (HARD) process number offset.

The second field is used for at least one of the following:
indicating second configuration information corresponding respectively to the multiple transmission configurations that are activated;
indicating a serial number of a first configuration information group; wherein, the first configuration information group includes second configuration information of the multiple transmission configurations;
indicating second configuration information of a first transmission configuration that is activated; the first transmission configuration is a first one of the multiple transmission configurations that are activated and arranged in sequence;
indicating second configuration information of a first transmission configuration and offsets of the multiple transmission configurations; or
indicating a serial number of a first element in a configuration information set; the first element in the configuration information set corresponds to second configuration information of the first transmission configuration and offsets of the multiple transmission configurations.

The first field or the second field or a verification field in the activation/deactivation information is at least one of following items in downlink control information (DCI):
an HARQ process number field;
a DMRS configuration field;
a time domain resource assignment (TDRA) field;
a frequency domain resource assignment (FDRA) field;
a redundancy version (RV) field;
a transmit power control (TPC) field;
a most significant bit (MSB) in modulation and coding scheme (MCS);
a modulation and coding scheme (MCS) field; or
a padding bit field of a predetermined length.

It should be noted that in FIG. 6, the bus architecture may include any number of interconnected buses and bridges, specifically various circuits such as one or more processors represented by the processor 61 and the memory represented by the memory 63 are connected together. The bus architecture can also connect various other circuits such as peripheral devices, voltage regulators, power management circuits, etc., which are all known in the field, and therefore, will not be further described herein. The bus interface provides the interface. The transceiver 64 may be a plurality of elements, that is, including a transmitter and a receiver, and provide a unit for communicating with various other devices on the transmission medium. For different terminals, the user interface 65 may also be an interface capable of connecting externally or internally to required equipment. The connected equipment includes, but is not limited to, a keypad, a display, a speaker, a microphone, a joystick, etc. The processor 61 is responsible for managing the bus architecture and general processing, and the memory 63 can store data used by the processor 61 when performing operations.

A person skilled in the art can understand that all or part of the steps in the above-mentioned embodiments can be implemented by hardware, or by a computer program instructing relevant hardware. The computer program includes instructions for performing parts or all of the steps of the above-mentioned method; and the computer program can be stored in a readable storage medium, and the storage medium can be any form of storage medium.

Some embodiments of the present disclosure further provide a computer-readable storage medium storing thereon a computer program. When the computer program is executed by a processor, various processes of the above-mentioned information transmission method embodiment are realized, and the same technical effect can be achieved. In order to avoid repetition, it won't be repeated here. The computer-readable storage medium is for example a read-only memory (ROM), random access memory (RAM), magnetic disk, optical disc, or the like.

It can be understood that the embodiments described in the present disclosure may be implemented by hardware, software, firmware, middleware, microcode, or a combination thereof. For hardware implementation, a module, unit, submodule, subunit and the like can be implemented in one or more application-specific integrated circuits (ASIC), digital signal processors (DSP), digital signal processing devices (DSP Device, DSPD), programmable logic devices (PLD), Field-Programmable Gate Arrays (FPGA), general-purpose processors, controllers, microcontrollers, microprocessors, other electronic units for performing the functions described in this disclosure or a combination thereof.

For a software implementation, the technology described in the embodiments of the present disclosure can be implemented by modules (for example, procedures, functions, etc.) that perform the functions described in the embodiments of the present disclosure. The software codes can be stored in the memory and executed by the processor. The memory can be implemented in the processor or external to the processor.

Therefore, the purpose of the present disclosure can also be realized by running a program or a group of programs on any computing device. The computing device may be a well-known general-purpose device. Therefore, the purpose of the present disclosure can also be achieved only by providing a program product containing program code for implementing the method or device of the present disclosure. That is, such a program product also constitutes the present disclosure, and a storage medium storing such a program product also constitutes the present disclosure. Obviously, the storage medium may be any well-known storage medium, or any storage medium developed in the future. It should also be pointed out that in the device and method of the present disclosure, obviously, each component or each step can be decomposed and/or recombined. This decomposition and/or recombination should be regarded as equivalent solutions of the present disclosure. In addition, the steps of the above-mentioned series of processing can be executed naturally in a chronological order of description, but it is not necessarily executed in the chronological order. Some steps can be performed in parallel or independently of each other.

In addition, it should be pointed out that in the device and method of the present disclosure, obviously, each component or each step can be decomposed and/or recombined. This decomposition and/or recombination should be regarded as equivalent solutions of the present disclosure. In addition, the steps of the above-mentioned series of processing can be executed naturally in a chronological order of description, but it is not necessarily executed in the chronological order. Some steps can be performed in parallel or independently of each other. A person skilled in the art can understand that all or any of the steps or components of the method and device of the present disclosure can be used in any computing device (including a processor, storage medium, etc.) or a network of computing devices, and can be implemented by hardware, firmware, software, or any combination thereof. This can be achieved by a person skilled in the art using their basic programming skills after reading the description of the present disclosure.

Therefore, the purpose of the present disclosure can also be realized by running a program or a group of programs on any computing device. The computing device may be a well-known general-purpose device. Therefore, the purpose of the present disclosure can also be achieved only by providing a program product containing program code for implementing the method or device of the present disclosure. That is, such a program product also constitutes the present disclosure, and a storage medium storing such a program product also constitutes the present disclosure. Obviously, the storage medium may be any well-known storage medium, or any storage medium developed in the future. It should also be pointed out that in the device and method of the present disclosure, obviously, each component or each step can be decomposed and/or recombined. This decomposition and/or recombination should be regarded as equivalent solutions of the present disclosure. In addition, the steps of the above-mentioned series of processing can be executed naturally in a chronological order of description, but it is not necessarily executed in the chronological order. Some steps can be performed in parallel or independently of each other.

The above are optional implementations of the present disclosure. It should be pointed out that for a person skilled in the art, several improvements and modifications can be made without departing from the principles of the present disclosure. These improvements and modifications should also fall within the scope of the present disclosure.

What is claimed is:

1. A configuration activation/deactivation method, comprising:
   transmitting, to a terminal, activation/deactivation information for indicating activation/deactivation of multiple transmission configurations;
   wherein, the multiple transmission configurations are associated with configuration information of the activation/deactivation information, wherein, the multiple transmission configurations are transmission configurations associated with a first search space (SS) or a first control resource set (CORESET) in the configuration information of the activation/deactivation information; the first SS is an SS where the activation/deactivation information is detected, and the first CORESET is a CORESET where the activation/deactivation information is detected;
   and/or,
   a first field of the activation/deactivation information is used for indicating activation/deactivation of the multiple transmission configurations, wherein, the first field is used for at least one of the following:
   indicating a bitmap of a correspondence relationship between configuration indexes corresponding to the multiple transmission configurations and bits, wherein the bits correspond to the configuration indexes in a one-to-one manner;
   indicating a first configuration index group, wherein the first configuration index group comprises configuration indexes of the multiple transmission configurations;
   indicating a serial number of a second configuration index group, wherein the second configuration index group comprises the configuration indexes of the multiple transmission configurations;
   indicating a configuration index corresponding to an initial transmission configuration among the multiple transmission configurations arranged in sequence;
   indicating the configuration index corresponding to the initial transmission configuration among the multiple transmission configurations arranged in sequence and a quantity of the multiple transmission configurations; or
   indicating a serial number of a first element in a configuration index set, wherein the first element in the configuration index set corresponds to the configuration index of the initial transmission configuration among the multiple transmission configurations arranged in sequence and the quantity of the multiple transmission configurations.

2. The configuration activation/deactivation method according to claim 1, wherein, the activation information used for indicating activation of the multiple transmission configurations includes a second field, and the second field is used for indicating activation of second configuration information that is different among the multiple transmission configurations.

3. The configuration activation/deactivation method according to claim 2, wherein, the second configuration information comprises at least one of the following:
- de-modulation reference signal (DMRS) configuration information;
- a time domain offset;
- a relative time domain offset; or
- a hybrid automatic repeat request (HARQ) process number offset;

and/or, wherein, the second field is used for at least one of the following:
- indicating the second configuration information corresponding respectively to the multiple transmission configurations that are activated;
- indicating a serial number of a first configuration information group, wherein the first configuration information group comprises the second configuration information of the multiple transmission configurations;
- indicating the second configuration information of a first transmission configuration that is activated, wherein the first transmission configuration is a first one of the multiple transmission configurations that are activated and arranged in sequence;
- indicating the second configuration information of the first transmission configuration and offsets of the multiple transmission configurations; or
- indicating a serial number of a first element in a configuration information set, wherein the first element in the configuration information set corresponds to the second configuration information of the first transmission configuration and the offsets of the multiple transmission configurations.

4. The configuration activation/deactivation method according to claim 2, wherein the first field or the second field or a verification field in the activation/deactivation information is at least one of following items in downlink control information (DCI):
- an HARQ process number field;
- a DMRS configuration field;
- a time domain resource assignment (TDRA) field;
- a frequency domain resource assignment (FDRA) field;
- a redundancy version (RV) field;
- a transmit power control (TPC) field;
- a most significant bit (MSB) in modulation and coding scheme (MCS);
- a modulation and coding scheme (MCS) field; or
- a padding bit field of a predetermined length.

5. A network device, comprising: a transceiver, a memory, a processor, and a program stored in the memory and configured to be executed by the processor, wherein the processor is configured to execute the program to implement following steps:
- transmitting, to a terminal, activation/deactivation information for indicating activation/deactivation of multiple transmission configurations;
- wherein, the multiple transmission configurations are associated with configuration information of the activation/deactivation information, wherein the multiple transmission configurations are transmission configurations associated with a first search space (SS) or a first control resource set (CORESET) in the configuration information of the activation/deactivation information; the first SS is an SS where the activation/deactivation information is detected, and the first CORESET is a CORESET where the activation/deactivation information is detected;

and/or, a first field of the activation/deactivation information is used for indicating activation/deactivation of the multiple transmission configurations, wherein the first field is used for at least one of the following:
- indicating a bitmap of a correspondence relationship between configuration indexes corresponding to the multiple transmission configurations and bits, wherein the bits correspond to the configuration indexes in a one-to-one manner;
- indicating a first configuration index group, wherein the first configuration index group comprises configuration indexes of the multiple transmission configurations;
- indicating a serial number of a second configuration index group, wherein the second configuration index group comprises the configuration indexes of the multiple transmission configurations;
- indicating a configuration index corresponding to an initial transmission configuration among the multiple transmission configurations arranged in sequence;
- indicating the configuration index corresponding to the initial transmission configuration among the multiple transmission configurations arranged in sequence and a quantity of the multiple transmission configurations; or
- indicating a serial number of a first element in a configuration index set, wherein the first element in the configuration index set corresponds to the configuration index of the initial transmission configuration among the multiple transmission configurations arranged in sequence and the quantity of the multiple transmission configurations.

6. The network device according to claim 5, wherein, the activation information used for indicating activation of the multiple transmission configurations comprises a second field, and the second field is used for indicating activation of second configuration information that is different among the multiple transmission configurations.

7. The network device according to claim 6, wherein, the second configuration information comprises at least one of the following:
- de-modulation reference signal (DMRS) configuration information;
- a time domain offset;
- a relative time domain offset; or
- a hybrid automatic repeat request (HARQ) process number offset;

and/or, wherein, the second field is used for at least one of the following:
- indicating the second configuration information corresponding respectively to the multiple transmission configurations that are activated;
- indicating a serial number of a first configuration information group, wherein the first configuration information group comprises the second configuration information of the multiple transmission configurations;
- indicating the second configuration information of a first transmission configuration that is activated, wherein the first transmission configuration is a first one of the multiple transmission configurations that are activated and arranged in sequence;

indicating the second configuration information of the first transmission configuration and offsets of the multiple transmission configurations; or indicating a serial number of a first element in a configuration information set, wherein the first element in the configuration information set corresponds to the second configuration information of the first transmission configuration and the offsets of the multiple transmission configurations.

8. The network device according to claim 6, wherein the first field or the second field or a verification field in the activation/deactivation information is at least one of following items in downlink control information (DCI):
an HARQ process number field;
a DMRS configuration field;
a time domain resource assignment (TDRA) field;
a frequency domain resource assignment (FDRA) field;
a redundancy version (RV) field;
a transmit power control (TPC) field;
a most significant bit (MSB) in modulation and coding scheme (MCS);
a modulation and coding scheme (MCS) field; or
a padding bit field of a predetermined length.

9. A configuration activation/deactivation method, comprising:
receiving activation/deactivation information for indicating activation/deactivation of multiple transmission configurations that is transmitted by a network device;
wherein, the multiple transmission configurations are associated with configuration information of the activation/deactivation information, wherein, the multiple transmission configurations are transmission configurations associated with a first search space (SS) or a first control resource set (CORESET) in the configuration information of the activation/deactivation information; the first SS is an SS where the activation/deactivation information is detected, and the first CORESET is a CORESET where the activation/deactivation information is detected; and/or,
a first field of the activation/deactivation information is used for indicating activation/deactivation of the multiple transmission configurations, wherein, the first field is used for at least one of the following:
indicating a bitmap of a correspondence relationship between configuration indexes corresponding to the multiple transmission configurations and bits, wherein the bits correspond to the configuration indexes in a one-to-one manner;
indicating a first configuration index group, wherein the first configuration index group comprises configuration indexes of the multiple transmission configurations;
indicating a serial number of a second configuration index group, wherein the second configuration index group comprises the configuration indexes of the multiple transmission configurations;
indicating a configuration index corresponding to an initial transmission configuration among the multiple transmission configurations arranged in sequence;
indicating the configuration index corresponding to the initial transmission configuration among the multiple transmission configurations arranged in sequence and a quantity of the multiple transmission configurations; or
indicating a serial number of a first element in a configuration index set, wherein the first element in the configuration index set corresponds to the configuration index of the initial transmission configuration among the multiple transmission configurations arranged in sequence and the quantity of the multiple transmission configurations;
activating/deactivating the multiple transmission configurations according to the activation/deactivation information.

10. The configuration activation/deactivation method according to claim 9, wherein, the activation information used for indicating activation of the multiple transmission configurations comprises a second field, and the second field is used for indicating activation of second configuration information that is different among the multiple transmission configurations.

11. The configuration activation/deactivation method according to claim 10, wherein, the second configuration information comprises at least one of the following:
de-modulation reference signal (DMRS) configuration information;
a time domain offset;
a relative time domain offset; or
a hybrid automatic repeat request (HARQ) process number offset;
and/or,
wherein, the second field is used for at least one of the following:
indicating the second configuration information corresponding respectively to the multiple transmission configurations that are activated;
indicating a serial number of a first configuration information group, wherein the first configuration information group comprises the second configuration information of the multiple transmission configurations;
indicating the second configuration information of a first transmission configuration that is activated, wherein the first transmission configuration is a first one of the multiple transmission configurations that are activated and arranged in sequence;
indicating the second configuration information of the first transmission configuration and offsets of the multiple transmission configurations; or
indicating a serial number of a first element in a configuration information set, wherein the first element in the configuration information set corresponds to the second configuration information of the first transmission configuration and the offsets of the multiple transmission configurations.

12. The configuration activation/deactivation method according to claim 10, wherein the first field or the second field or a verification field in the activation/deactivation information is at least one of following items in downlink control information (DCI):
an HARQ process number field;
a DMRS configuration field;
a time domain resource assignment (TDRA) field;
a frequency domain resource assignment (FDRA) field;
a redundancy version (RV) field;
a transmit power control (TPC) field;
a most significant bit (MSB) in modulation and coding scheme (MCS);
a modulation and coding scheme (MCS) field; or
a padding bit field of a predetermined length.

13. A terminal, comprising: a transceiver, a memory, a processor, and a program stored in the memory and configured to be executed by the processor, wherein the processor is configured to execute the program to implement the steps of the method according to claim 9.

14. The terminal according to claim 13, wherein, the activation information used for indicating activation of the multiple transmission configurations comprises a second field, and the second field is used for indicating activation of second configuration information that is different among the multiple transmission configurations.

15. The terminal according to claim 14, wherein, the second configuration information comprises at least one of the following:
- de-modulation reference signal (DMRS) configuration information;
- a time domain offset;
- a relative time domain offset; or
- a hybrid automatic repeat request (HARQ) process number offset;

and/or, wherein, the second field is used for at least one of the following:
- indicating the second configuration information corresponding respectively to the multiple transmission configurations that are activated;
- indicating a serial number of a first configuration information group, wherein the first configuration information group comprises the second configuration information of the multiple transmission configurations;
- indicating the second configuration information of a first transmission configuration that is activated, wherein the first transmission configuration is a first one of the multiple transmission configurations that are activated and arranged in sequence;
- indicating the second configuration information of the first transmission configuration and offsets of the multiple transmission configurations; or
- indicating a serial number of a first element in a configuration information set, wherein the first element in the configuration information set corresponds to the second configuration information of the first transmission configuration and the offsets of the multiple transmission configurations.

16. The terminal according to claim 14, wherein the first field or the second field or a verification field in the activation/deactivation information is at least one of following items in downlink control information (DCI):
- an HARQ process number field;
- a DMRS configuration field;
- a time domain resource assignment (TDRA) field;
- a frequency domain resource assignment (FDRA) field;
- a redundancy version (RV) field;
- a transmit power control (TPC) field;
- a most significant bit (MSB) in modulation and coding scheme (MCS);
- a modulation and coding scheme (MCS) field; or
- a padding bit field of a predetermined length.

* * * * *